United States Patent [19]
D'Angelo

[11] Patent Number: 5,844,145
[45] Date of Patent: Dec. 1, 1998

[54] CHASSIS DYNAMOMETER EMPLOYING LATERALLY MOVING ROLLER ASSEMBLIES DURING ALIGNMENT OF VEHICLE

[75] Inventor: Severino D'Angelo, Laguna Beach, Calif.

[73] Assignee: Snap-on Technologies, Inc., Lincolnshire, Ill.

[21] Appl. No.: 613,449

[22] Filed: Mar. 1, 1996

[51] Int. Cl.[6] .................................................. G01L 3/22
[52] U.S. Cl. ................................... 73/862.18; 73/862.17
[58] Field of Search ............................ 73/117, 862.14, 73/862.15, 862.16, 862.17, 862.18, 862.09

[56] References Cited

U.S. PATENT DOCUMENTS

| | | |
|---|---|---|
| 1,490,442 | 5/1924 | Whalen . |
| 1,964,532 | 10/1934 | Platzer . |
| 3,455,153 | 7/1969 | Levine et al. .............................. 73/117 |
| 3,491,587 | 1/1970 | Morris et al. . |
| 3,690,165 | 9/1972 | Sturmo et al. ............................ 73/117 |
| 3,861,204 | 1/1975 | Fillingim . |
| 4,077,255 | 3/1978 | Murakami . |
| 4,158,961 | 6/1979 | Ben-David ................................ 73/117 |
| 4,635,472 | 1/1987 | Scourtes ................................... 73/117 |
| 4,825,690 | 5/1989 | Mears . |
| 4,912,970 | 4/1990 | Gicewicz . |
| 5,086,647 | 2/1992 | Kamata et al. . |
| 5,101,660 | 4/1992 | La Belle . |
| 5,154,076 | 10/1992 | Wilson et al. . |
| 5,231,870 | 8/1993 | Fukuda et al. ............................ 73/117 |
| 5,269,179 | 12/1993 | Vattakattu et al. . |
| 5,323,644 | 6/1994 | Schaefer .................................... 73/117 |
| 5,335,537 | 8/1994 | Shibayama et al. ...................... 73/117 |
| 5,445,013 | 8/1995 | Clayton, Jr. et al. ..................... 73/117 |
| 5,452,605 | 9/1995 | Wilson et al. . |

*Primary Examiner*—Ronald L. Biegel
*Attorney, Agent, or Firm*—Emrich & Dithmar

[57] ABSTRACT

A chassis dynamometer for simulating the road load and inertia of a vehicle comprised of two axially-movable roller assemblies and a track to guide their axial movement is described. The two independent roller assemblies are free to slide right or left along a track fixed to the lab floor during the vehicle alignment phase that precedes actual testing. Each of said independent roller assemblies includes one or more rollers to engage the driving tire of the vehicle. Said rollers are mechanically coupled to a power absorber and flywheel for simulating the road load and/or inertia of the vehicle. A control system responding to signals from the speed and torque sensors, using a torque split control method, electrically synchronizes the speeds of the two separate assemblies while simulating the selected road load and inertia of the vehicle. Alignment of the vehicle on the dynamometer and positioning of the roller assemblies squarely under the driving tires is achieved by forward and/or reverse rotation of the rollers. A manual or automatic mechanisms locks the individual roller assemblies to the floor track.

20 Claims, 3 Drawing Sheets

CHASSIS DYNAMOMETER EMPLOYING LATERALLY MOVING ROLLER ASSEMBLIES DURING ALIGNMENT OF VEHICLE

BACKGROUND OF THE INVENTION

1. Technical Field

This invention relates to chassis dynamometers for road simulation and other controlled engine loading for the purpose of exhaust emission measurement, vehicle performance testing, and diagnostics, and more particularly to small, lightweight chassis dynamometers suitable for use in confined spaces by operators who may not be familiar with dynamometers. Specifically, the invention is comprised of two independent roller assemblies which, before the vehicle is placed on the dynamometer and, more importantly, during the vehicle alignment phase that precedes testing, are free to slide right or left along a fixed track.

2. Discussion

To meet the requirements of the 1990 Clean Air Act, the exhaust emissions of vehicles in circulation must be measured in a realistic way. The result has been an increased demand for the routine use of chassis dynamometers in emissions testing. Dynamometers provide a better simulation of actual driving conditions, and as a consequence, cause the vehicle to generate more realistic levels of exhaust emissions than do tests in which the vehicle's engine is not loaded.

In general, chassis dynamometers employed in emissions testing are road emulators for motor vehicles. They are able to simulate both road load and vehicle inertia, or other loads, as required by the testing procedure. Test vehicles transfer their power to the dynamometer through a set of rollers rotating under the vehicle driving wheels. In turn, the rollers are mechanically coupled to a power absorber that applies the designated loading by means of computer control. Commonly, power absorbers consist of either AC or DC electric motors, hydrokinetic brakes or eddy current brakes. Inertia simulation is typically achieved via fixed or clutchable multiple flywheels, often supplemented by the power absorber. Emissions testing of vehicles in circulation has traditionally been performed by privately owned garages and by automobile mechanics using procedures that do not involve the loading of the vehicle's engine. To conform to the new regulations, participating garages are required for the first time to purchase chassis dynamometers, and mechanics are required to use them, often with little prior experience. Given this scenario, it is advantageous to develop such devices that are safe, easy to install, operate and maintain, at a reasonable cost.

In government regulated emissions testing, chassis dynamometers must typically be able to test vehicles up to 100 inches overall width. Prior art chassis dynamometers (e.g., U.S. Pat. Nos. 4,825,690 and 5,445,013) must meet this requirement by offering a long roller assembly. In addition to the 100 inches required for the rollers themselves, space is required for external bearings, pulleys, flywheels, and/or power absorbers, with the result that a dynamometer may have an overall width of 110 to over 200 inches. Such devices require strong frames to support their roller spans and other components. This results in a relatively large and heavy machine, and generates a number of problems for both garage owners and automobile mechanics who must use such equipment:

a. Insufficient space in small garages to house a large dynamometer.

b. Danger associated with the exposed portion of the long rotating rolls during vehicle testing.

c. Danger associated with lateral movement of front-wheel drive vehicles along the rollers.

d. High cost of transporting and installing bulky and heavy dynamometer assemblies.

e. High cost of manufacturing large dynamometers.

Prior art solves some of these problems by offering various additional equipment, at corresponding additional expense. For example, the safety issues of exposed rotating rolls and lateral vehicle motion have been confronted by offering manual or automatic roller covers and vehicle restraint systems. Certain transportation and installation problems have been confronted by making dynamometers portable (e.g., U.S. Pat. Nos. 3,491,587 and 3,861,204). However, portable dynamometers also require relatively long rollers to provide space for vehicle movement during alignment. The problems of exposed rollers and lateral movement of front-wheel-drive vehicles are approached by portable dynamometers in the same manner as fixed dynamometers, i.e., by adding manual or automatic roller covers and vehicle restraint systems to the dynamometer. It will be seen that the present invention resolves all the problems listed above in a compact, light-weight and low-cost dynamometer. This is achieved by (a) placing two independent roller assemblies on a track and permitting them to slide from side to side during the vehicle alignment process, and (b) by providing a control system that yields accurate and responsive speed synchronization from side to side.

In non-portable, prior art chassis dynamometers, the frame is fixed in a pit or to the floor. Because they are not axially movable, the rollers of such dynamometers must be significantly wider than the driving tires, not only to allow for vehicles with various track widths, but also to provide sufficient space for tire movement in vehicles that are initially misaligned. In portable, prior art chassis dynamometers, the frame is movable for the purpose of transporting the dynamometer itself, however, as in non-portable dynamometers, the frame is fixed before the vehicle mounts the rollers and it remains fixed during the alignment of the vehicle. Thus the rollers of prior art dynamometers are rotatable, but are not axially movable with the vehicle in-place.

Persons skilled in the art will note that several kinds of automotive diagnostic and testing devices exist in which rollers bearing the weight of the vehicle are free to move horizontally (e.g., U.S. Pat. No. 4,912,970). However, these must not be confused with chassis dynamometers, as they are incapable of simulating the road load and inertia forces of the vehicle under test. Furthermore, the operation of these devices is dependent upon said horizontal mobility during the driving test, itself. In the present invention, horizontal mobility is never employed during the driving test. Mobility is exploited only during the positioning of the vehicle, prior to the test, and then at very low speeds while the roller assemblies are guided by a track secured to the floor.

The present invention is novel in that the roller assemblies which simulate road load and inertia for the vehicle are mounted in a way that allows them to slide axially, i.e., to move freely and independently, left and right, while the vehicle's driving tires are on the rollers. Their movement is restricted in any other direction. While the roller assemblies are free to slide, the vehicle is limited to very low speeds. During actual testing, lateral movement is prevented with an automatic lock. As a result of the permitted axial movement during vehicle alignment, the rollers under each driving tire do not have to be 2.5 to 3 ft long (e.g., as in prior art shown in FIG. 2), nor are long rollers of 100" required. Each roller can be just slightly wider than the widest tires that are expected to be tested, e.g., about 1 to 1.5 ft. The several advantages arising from the smaller roller length will become evident in the discussion that follows.

SUMMARY OF THE INVENTION

The advantages of the present invention over prior art arise from its smaller size and improved safety, both of which are achievable at reduced cost. In turn, the smaller size makes the device easier to transport, easier to install, and it takes up less space after it has been installed. These advantages are described in more detail below.

In the preferred embodiment of the invention, the mechanical assembly consists of three fundamental parts: (1) left roller assembly, (2) right roller assembly, and (3) mounting track (FIG. 1). The mounting track attaches to the floor (in the case of an above-ground installation), or to the bottom of the pit (in the case of a pit installation). The roller assemblies are guided by the track, while the weight of the assemblies is supported by small rollers on the underside of their frames. The latter small rollers make contact with the floor. If desired, the tracks for an above-ground installation may be extended farther to the right or left to allow the assemblies to be pushed completely out of the way when not in use.

In the preferred embodiment of the invention (FIGS. 4, 5, 6), the roller assemblies include the rollers themselves, a power absorber (electric motor controlled by a flux-vector power converter), a torque measuring device, a speed measuring device, and a flywheel to simulate inertia. The flywheel and motor are linked to the rollers via belts and pulleys such that their rotational speed is several times as fast as the rotational speed of the rollers. This permits the dynamometer to apply great forces at the roller surface using a relatively low-torque motor and small flywheel.

The primary safety advantage of the present invention over equivalent prior art arises from the shorter rollers. Personnel walking near the dynamometer do not risk stepping on exposed, spinning rollers when a vehicle is being tested. Further, if the present invention is installed in a pit, any pit areas not covered by the roller assemblies are protected by light-weight plates that move to the left and right along with the roller assemblies. Thus, despite the short rollers, there is no possibility of accidently falling into the pit.

A secondary safety advantage arising from the relatively short rollers is the simplicity of the wheel restraints that can be used. The wheel restraints of the preferred embodiment consist of four small rollers, two on the inside and two on the outside of each tire. These rollers keep the tires from moving right or left if the steering wheel of the vehicle is accidently turned. The front roller keeps the tire from driving forward off the dynamometer. The rollers are an integral part of the dynamometer and the latter cannot be successfully operated without them. Thus, it is not possible for an inexperienced garage mechanic to drive on the dynamometer without the tire restraint system in place.

Several other advantages of the invention also arise from its smaller size relative to equivalently powered chassis dynamometers. Each of the roller assemblies weighs roughly 200–500 lbs, depending on its power rating. In contrast, an equivalent prior art device weighs roughly 3,000 to 6,000 lbs. Prior art dynamometers are typically shipped as a single, large unit to minimize the amount of assembly required during installation. They require heavy lifting and moving equipment for transport and installation. The roller assemblies of the present invention can be shipped independently, and being lighter, are easier and safer to handle, and still simple to install.

The dynamometer includes a computerized system to control vehicle loading and simulate inertia and road load while maintaining the two separate assemblies at equal speeds. The computer processes the speed and torque signal inputs from both roller assemblies and uses torque split software algorithms to generate independent load commands to the two absorbers. Said torque split algorithms as developed by this inventor simultaneously accomplish two objectives: (1) the combined retarding force of right and left rollers must equal the total retarding force required to simulate the road load and inertia of the vehicle, and (2) the rotational speeds of right and left rollers must always be equal, regardless of any differential forces applied by the right and left. The following equations describe this torque splitting method for correctly distributing the total retarding force between left and right roller assemblies. A different algorithm for controlling the torque split has also been developed by this inventor. Both approaches yield virtually identical results, and the second method is not described here. The unregulated force command to the right power absorber is:

$$F_{R-PAU} = F_L \frac{I_V - I_L}{I_R + I_L} + (F_{RL} - F_{PLR} - F_R) \frac{I_L}{I_R + I_L}$$

The corresponding force command to the left power absorber is:

$$F_{L-PAU} = F_R \frac{I_V - I_R}{I_L + I_R} + (F_{RL} - F_{PLL} - F_L) \frac{I_R}{I_L + I_R}$$

The symbols used in these equations are as follows. (Note that all forces, speeds and inertias are referenced to the surface of the respective rollers.)

$F_{R-PAU}$ = Force command to right power absorber
$F_L$ = Tangential force being applied to left roller by vehicle, calculated in real time as:

$$F_L = F_{ML} - F_{PLL} + I_L dV_L/dt$$

$F_{ML}$ = Force measured by load cell of left power absorber
$F_{PLL}$ = Parasitic losses of left roller assembly
$I_L$ = Mechanical inertia of left roller assembly
$V_L$ = Speed of left roller assembly
$I_v$ = Inertia setting for vehicle being tested
$I_R$ = Mechanical inertia of right roller assembly
$F_{RL}$ = Total road load to be simulated by dynamometer
$F_{PLR}$ = Parasitic losses of right roller assembly
$F_R$ = Tangential force being applied to right roller by vehicle, calculated in real time as:

$$F_R = F_{MR} - F_{PLR} + I_R dV_R/dt$$

$F_{MR}$ = Force measured by load cell of right power absorber
$V_R$ = Speed of right roller assembly
$F_{L-PAU}$ = Force command to left power absorber In embodiments of the present invention in which both left and right sliding roller assemblies are mechanically and rotationally linked, and are controlled by a single absorber and single flywheel, the computer requires only a single torque signal and speed signal input, and it generates load commands to a single absorber. Simpler chassis dynamometer algorithms (e.g., D'Angelo & Gafford, 1981) are applicable to the single-absorber configuration.

To correct errors introduced by the power absorption systems, which in the case of the preferred embodiment is comprised of the two AC motors and their flux-vector motor drives, the force command must be continually adjusted through feedback regulation. Feedback is made possible by the real-time monitoring of force and speed of the right and left roller assemblies ($F_{MR}$, $F_{ML}$, $V_R$, and $V_L$). The method employed in the preferred embodiment is modified from the classic PID regulator and consists of three terms for each of the left and right absorbers. The three feedback terms used to regulate the right absorber are the following:

$$C_{R1} = \frac{I_L}{I_L + I_R} \left[ I_L \frac{dV_R}{dt} - I_L \frac{dV_L}{dt} - (F_{MR} + F_{ML} + F_{PLR} - F_{RL}) \right]$$

$$C_{R2} = \frac{I_L}{I_L + I_R} \left[ I_L V_R - I_L V_L - \int_0^t (F_{MR} + F_{ML} + F_{PLR} - F_{RL}) dt \right]$$

$$C_{R3} = \frac{I_L}{I_L + I_R} \int_0^t \left[ I_L V_R - I_L V_L - \int_0^t (F_{MR} + F_{ML} + F_{PLR} - F_{RL}) dt \right] dt$$

The three feedback terms used to regulate the left absorber are the following:

$$C_{L1} = \frac{I_R}{I_L + I_R} \left[ I_R \frac{dV_L}{dt} - I_R \frac{dV_R}{dt} - (F_{MR} + F_{ML} + F_{PLL} - F_{RL}) \right]$$

$$C_{L2} = \frac{I_R}{I_L + I_R} \left[ I_R V_L - I_R V_R - \int_0^t (F_{MR} + F_{ML} + F_{PLL} - F_{RL}) dt \right]$$

$$C_{L3} = \frac{I_R}{I_L + I_R} \int_0^t \left[ I_R V_L - I_R V_R - \int_0^t (F_{MR} + F_{ML} + F_{PLL} - F_{RL}) dt \right] dt$$

The first term of the regulators ($C_{R1}$ and $C_{L1}$) are proportional force corrections. The second terms ($C_{R2}$ and $C_{L2}$) are integrals and effect a speed correction. The third terms ($C_{R3}$ and $C_{L3}$) are double integrals and effect a distance correction.

The procedure for installing the vehicle on the present invention is different from that on prior art devices employing fixed rollers. In all chassis dynamometers, both the driving and non-driving tires of the vehicle must be positioned perpendicularly to the axis of the rollers before the test begins. This positioning is referred to as "vehicle alignment". In the present invention, the first step in the alignment procedure is to slide the movable roller assemblies in front of the vehicle wheels, lock them in place, and then to drive or push the vehicle onto the rollers. To align the vehicle and to correctly position the tires between the small side rollers, the operator unlocks the movable roller assemblies, and slowly rotates the driving wheels, either forward or reverse, or forward and reverse in succession. At the point where the positioning of one of the assemblies is satisfactory, the operator locks that assembly in place. When the second roller assembly is satisfactorily positioned, it, too is locked in place. The assemblies are correctly positioned when the vehicle can drive forward or in reverse on the rollers without the driving wheels making contact with the side restraint rollers. The locking is done remotely via the use of a solenoid or other locking device, so that the driver, working alone, is not required to exit the vehicle. Alternatively, locking may be automated by the use of tire position sensors. Mirrors may be preferred by some drivers to aid in determining when the vehicle is correctly positioned. When both the sliding assemblies are positioned and locked in place, the operation of the present invention during a driving test is not notably different from that of prior art chassis dynamometers. Thus, the novel aspect of the invention lies in the freely movable nature of the roller assemblies during the alignment procedure and the accurate splitting of torque between right and left absorbers using software algorithms. This mobility is exploited prior to actual vehicle testing, and as explained earlier, it confers significant advantages relating to space saving, safety, shipping ease, and manufacturing cost.

DESCRIPTION OF THE PREFERRED EMBODIMENT

Figure 1:
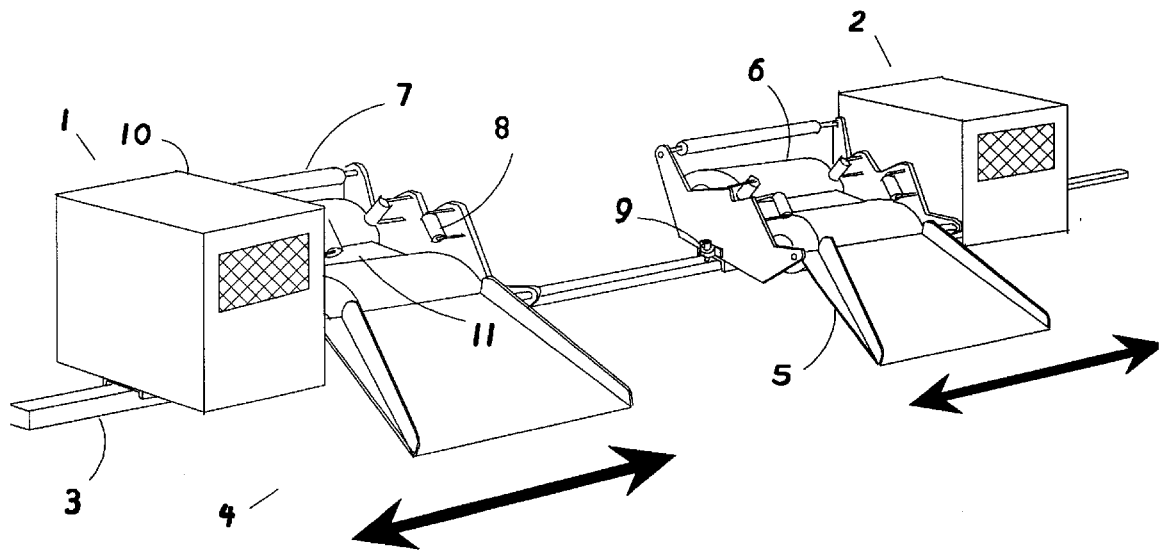
FIG. 1 is a schematic view of the preferred form of the invention installed above-ground, with the right and left roller assemblies mounted on a single track and able to freely slide thereon.

Referring to FIG. 1, there are shown left 1 and right 2 roller assemblies mounted on a track 3. The track is attached to the floor 4, and in this embodiment, the entire apparatus is above-ground. Alternatively, the track and assemblies may be mounted in a pit. Prior to driving the vehicle onto the dynamometer, the two roller assemblies and their respective ramps 5 are positioned in an approximate way in front of the tires. Ramps are not required when the apparatus is installed in a pit. The assemblies are then locked in place so that they will not move while the vehicle is mounting the rollers 6. A front-wheel-drive vehicle is driven forward onto the dynamometer; a rear-wheel-drive vehicle is driven onto the rollers in reverse. The front restraining roller 7 and lateral restraining rollers 8 keep the vehicle's tires on the rollers.

After the vehicle's driving tires are on the rollers the locking mechanism 9 on the assemblies is released, permitting them to freely slide laterally, and the alignment procedure commences. After the vehicle has been aligned and the driving tires are centered on the rollers and not in contact with the side restraint rollers, the assemblies are again locked in place and testing can begin.

The other principal components illustrated in FIG. 1 is the protective shroud 10 that covers the belts, flywheel, and absorber. To aid in removal of the vehicle following a test, a pneumatic lift 11 is provided. A lift platform is located between the rollers, under each tire. A computer control unit 40 is coupled to the roller assemblies 1 and 2 for controlling operation thereof, including execution of the torque split algorithms, described above.

Figure 2:
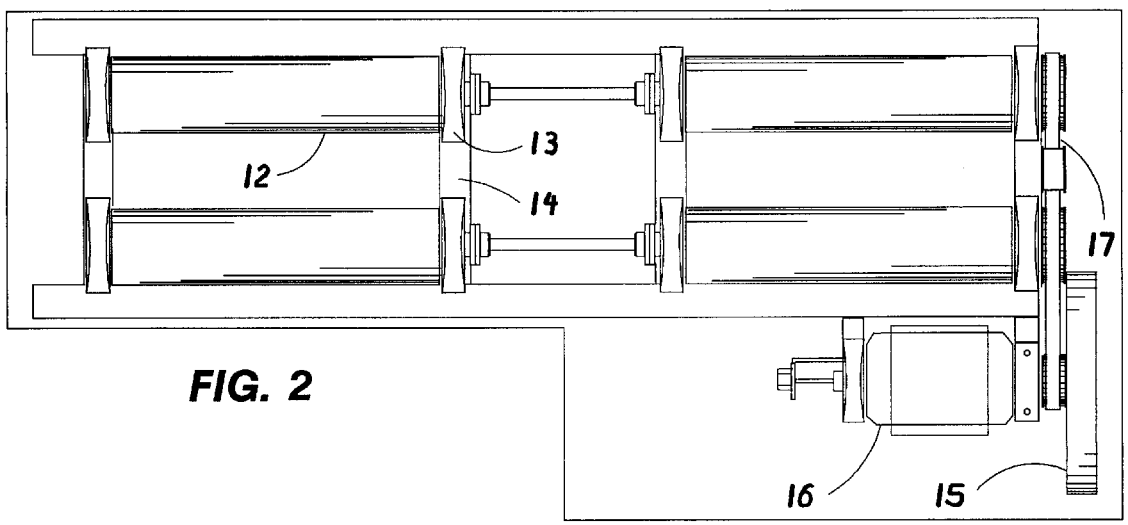
FIG. 2 is a schematic plan view of a prior art chassis dynamometer, illustrating the long, fixed rollers of those devices.

FIG. 2 shows an example of a prior art chassis dynamometer in which the rollers 12 are fixed via bearings 13 to a frame 14, and are not free to move laterally. The flywheel 15 is mounted on the shaft of an electric motor 16 and is coupled to the rollers by a belt 17. Unlike the rollers of the present invention, those of prior art devices are considerably wider that the driving tires of the test vehicle. This is necessary in fixed roller designs to allow for various track widths and for movement of the tires to the right or left when the vehicle is aligned.

Figure 3:
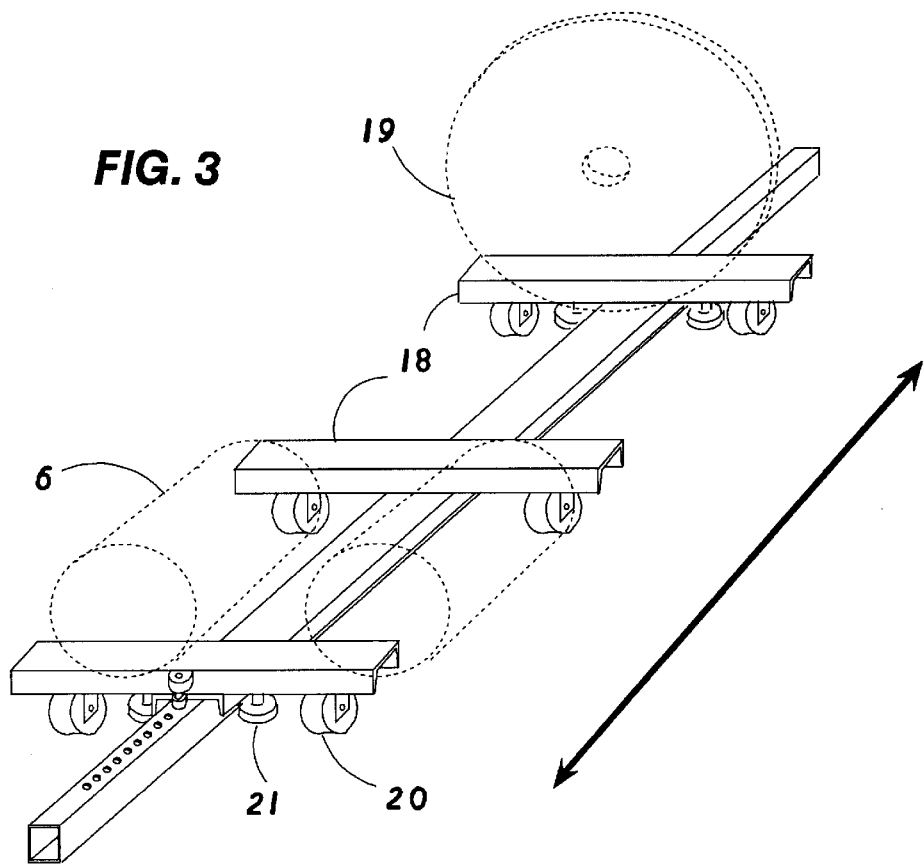
FIG. 3 illustrates a frame design for one moving assembly (the right-hand assembly), showing the location of the small wheels that permit it to move axially, and the pin assembly that permits it to be locked in place. The approximate location of the rollers and flywheel are indicated for reference. All other components have been removed for clarity.

FIG. 3 shows only the fixed track 3 and the frame 18 of one of the movable roller assemblies. The two rollers 6 and flywheel 19 are included as dashed lines for reference purposes. The moving of the assembly frame is facilitated by the six rollers 20 making contact with the floor. These rollers support the weight of the assembly, in addition to that of the test vehicle. The assembly is guided by the four rollers 21 that engage the sides of the fixed track 3. The axes of the guide rollers are mounted vertically. All the rollers are equipped with bearings and are adjustable.

Figure 4:
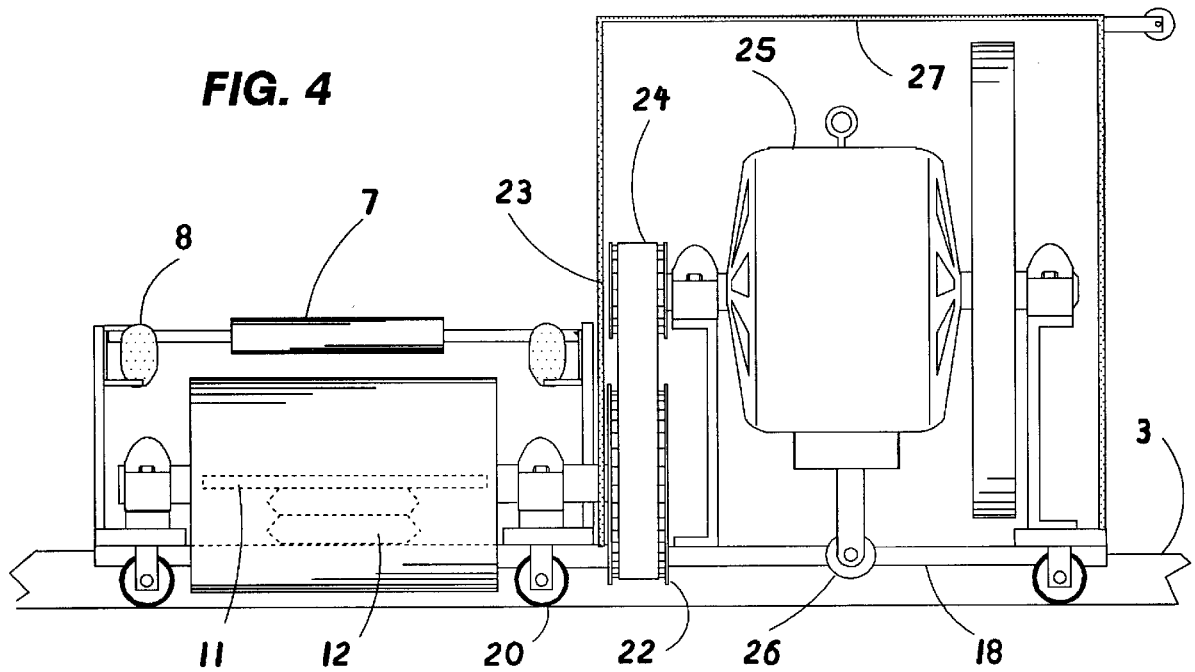
FIG. 4 is an elevation view of one roller assembly, illustrating the relative locations of the principal components of the preferred embodiment of the invention.

FIG. 4 shows an elevation view of the right roller assembly with a view into the area occupied by the absorber. A pulley 22 is mounted to each of the roller shafts 6. These pulleys are linked to a smaller pulley 23 on the absorber/flywheel shaft by means of a belt 24. The absorber in the preferred embodiment is an electric AC motor 25. The motor controls the loading that is being applied tangentially to the vehicle's driving tires during the test. The loading force is measured by the load cell 26 mounted between the motor stator and the frame 18 of the roller assembly. The lift 11 is activated by a pneumatic actuator 12 located directly beneath it. The front restraint roller 7 and two of the four side restraint rollers 8 are also evident in FIG. 3. As described earlier, the entire assembly is supported by small rollers 20 as it moves along the track 3. A protective shroud 27 covers the pulleys, belt, motor, and flywheel.

Figure 5:
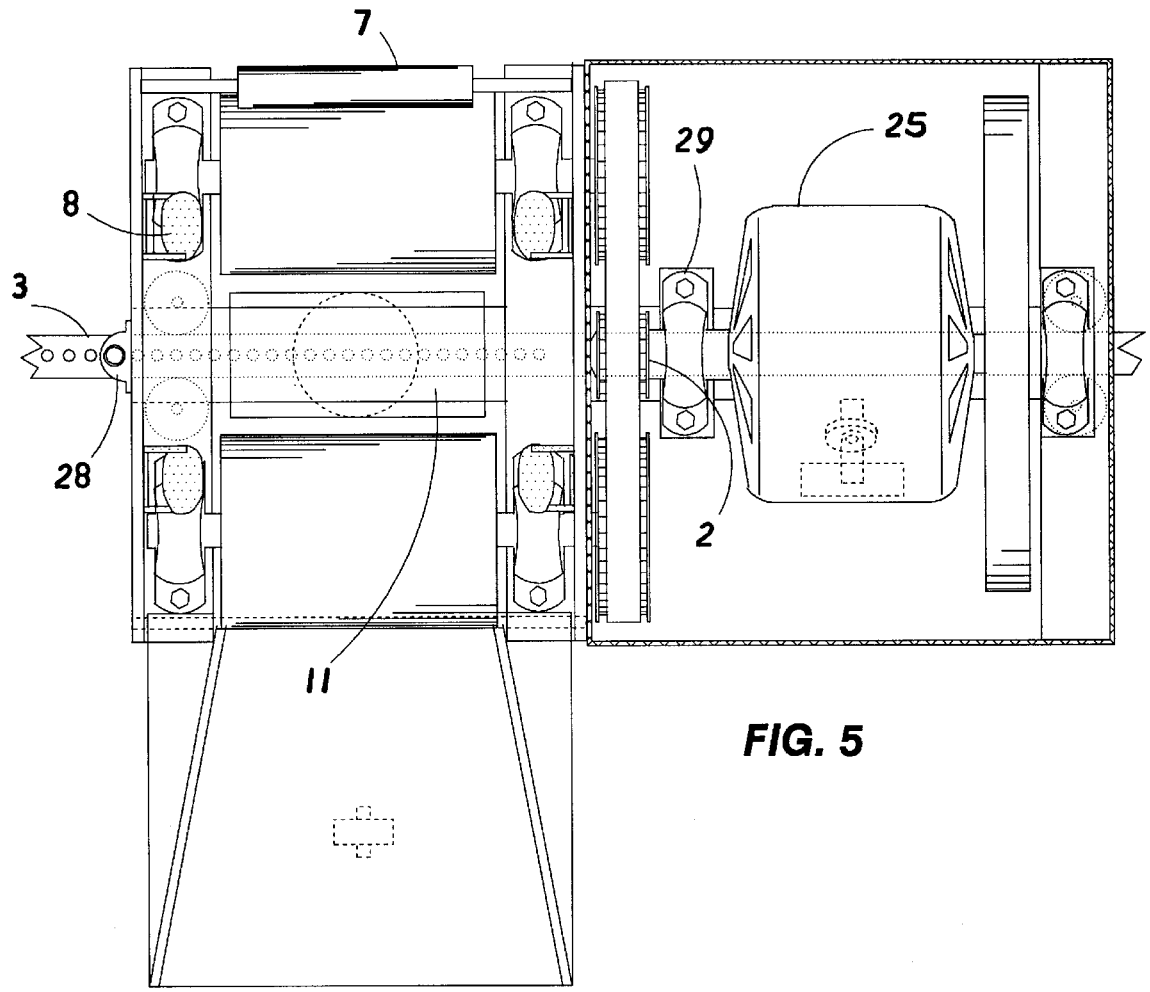
FIG. 5 is a plan view of the same roller assembly shown in FIG. 4.

FIG. 5 shows the right roller assembly in plan view, mounted over the track 3 on which it travels. The assembly is locked into position by the releasing of a spring-loaded pin 28 into holes in the top of the track 3. The locations of the four small side rollers 8 and the front roller 7 are clear in this view, as is the lift 11. The shroud 27 is cut away to show the locations of the motor absorber 25, pulley 23, and flywheel 19 on a single shaft supported by bearings 29.

Figure 6:
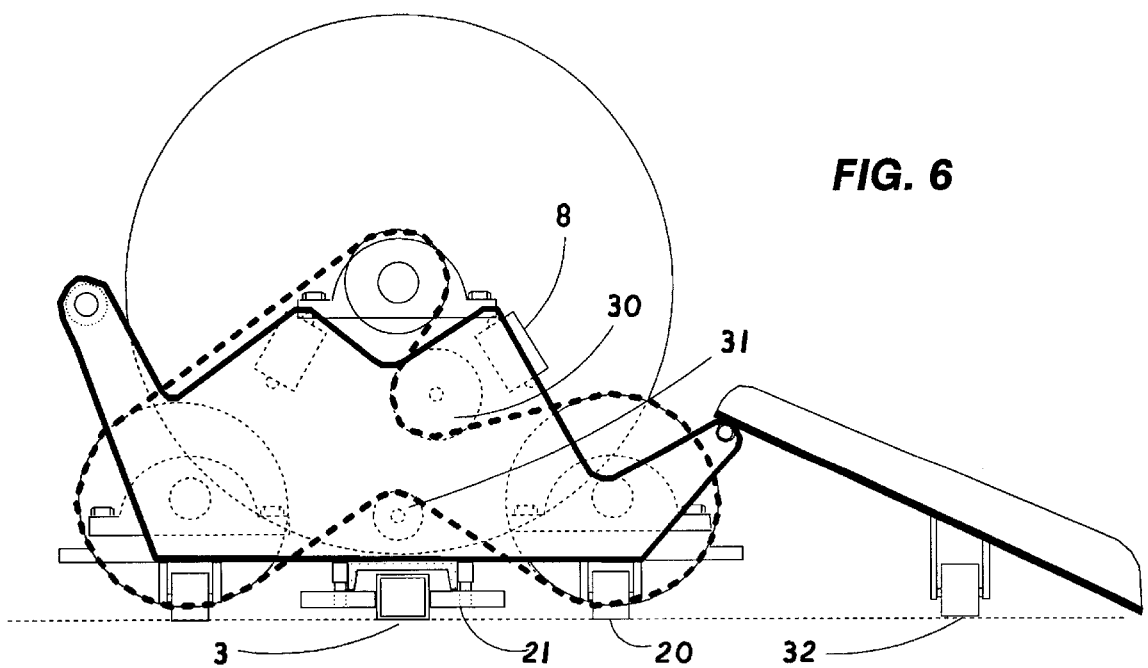
FIG. 6 is an illustration of the same roller assembly shown in FIGS. 4 and 5, in axial view, illustrating the locations of the pulleys and belt of the preferred embodiment.

Referring now to FIG. 6, the location of the belt 24 and the pulleys which it engages are evident. The larger idler pulley 30 is adjustable, allowing for the correct tensioning of the belt, or its removal. The smaller idler pulley 31 is used to elevate the belt above the track, permitting the rollers to be as close to the floor as possible. Also shown in FIG. 6 are the wheels 20 that support the dynamometer assembly itself, as well as the ramp wheel 32. The horizontal rollers 21 keep the assemblies on the track 3. The side rollers 8 are positioned such that their axes of rotation are parallel to the radius of the typical tire at the points of contact with the tire sidewall.

In summary, the preferred embodiment of the invention exploits an AC motor controlled by a flux-vector power converter as the power absorber, a belt to transfer power, a single flywheel, and two rollers in contact with each driving tire of the vehicle. Persons skilled in the art will appreciate that the invention may be applied equally to certain other kinds of chassis dynamometers. For example, the AC motor might be replaced or supplemented by an eddy-current brake, or a DC motor, or a friction brake, etc. The pulley and belt system may be replaced by gears, and instead of two rollers applied to each driving tire, there may be only a single roller, or instead of a roller, there may be a treadmill belt. Likewise, each moving assembly may consist of rollers, absorber, flywheel, and sensors, as in the preferred embodiment, or, alternatively, the moving assembly of one or both sides may consist of only the rollers, their immediate framework, and their bearings, while the absorber, flywheel, etc., could be permanently fixed. In the latter embodiment, the absorber would communicate rotatably with the moving roller assembly by a splined shaft or similar means. In like manner, there are several ways to permit the moving assemblies to travel with a minimum of friction. For example, instead of casters and guide rollers, the assemblies may be mounted on linear bearings; there may be two or three tracks, rather than one, and so on. The track may be recessed into the floor instead of being attached to the floor surface. Alternatively, the entire assemblies and track may be installed in a pit. In the description of the preferred embodiment, the alignment of the vehicle is facilitated by using either vehicle power or dynamometer power to slowly rotate the driving tires on the rollers, in forward and/or reverse direction, while the lateral movement of the roller assemblies occurs as a passive consequence of such rotation. Alternatively, alignment may be facilitated by the application of an external lateral force while the driving tires and rollers are rotating. These and related variations are interpreted by the inventor as alternative embodiments which fall within the scope and spirit of the invention, the novelty of which resides rather in the lateral mobility of the roller assemblies during vehicle alignment and the splitting of torque between the right and left assemblies by electric means.

What is claimed is:

1. A chassis dynamometer for the simulation of road load and/or inertia of a motor vehicle having left and right driving tires rotatable about an axis, comprising:

two roller assemblies for respectively engaging the left and right driving tires of the vehicle, each of said roller assemblies including:

a supporting frame, a roller set including at least one roller rotatably mounted on said frame for engaging a driving tire of the vehicle, a simulation assembly for the simulation of road load and/or inertia, means for mechanically coupling at least one roller of the set with the simulation assembly, and means coupled to the simulation assembly for measuring torque and speed;

a guide mechanism supporting said two roller assemblies for movement independently of each other in directions axially of the associated vehicle driving tires; and control means coupled to each of said roller assemblies for synchronizing the operations thereof and for controlling said simulation assemblies to thereby simulate road load and/or inertia forces for the vehicle.

2. The dynamometer of claim 1, wherein said control means includes mechanical coupling means for synchronizing speeds of the two roller assemblies.

3. The dynamometer of claim 2, wherein said mechanical coupling means includes a variable length spline.

4. The dynamometer of claim 1, wherein said control means includes electrical synchronizing means for synchronizing the speeds of the roller assemblies.

5. The dynamometer of claim 1, wherein each of the simulation assemblies includes a flywheel.

6. The dynamometer of claim 1, wherein each of the simulation assemblies includes an eddy current brake.

7. The dynamometer of claim 1, wherein each of the simulation assemblies includes a motor.

8. The dynamometer of claim 7, wherein said motor is an electric motor.

9. The dynamometer of claim 1, wherein said guide mechanism includes one or more tracks extending axially of the vehicle tires, said roller assemblies being movable along said tracks.

10. The dynamometer of claim 1, wherein said simulation assembly includes an eddy current brake having a ferromagnetic rotor comprising a flywheel rotatably mounted on a shaft, said speed measuring means being coupled to the flywheel shaft, and said torque measuring means being coupled to the eddy current brake.

11. A chassis dynamometer for the simulation of road load and/or inertia of a motor vehicle having left and right driving tires rotatable about an axis, comprising:

two treadmill assemblies for respectively engaging the left and right driving tires of the vehicle, each of said treadmill assemblies including:
 a supporting frame,
 a treadmill set including a flat endless belt and two or more rollers rotatably mounted on said frame for drivingly supporting and guiding said belt along an endless path disposed for engaging a driving tire of the vehicle,
 a simulation assembly for the simulation of road load and/or inertia,
 means for mechanically coupling said treadmill set with the simulation assembly, and
 means coupled to the simulation assembly for measuring torque and speed;

a guide mechanism supporting said two treadmill assemblies for movement independently of each other in directions axially of the associated vehicle driving tires; and control means coupled to each of said treadmill assemblies for synchronizing the operations thereof and for controlling said simulation assemblies to thereby simulate road load and/or inertia forces for the vehicle.

12. The dynamometer of claim 11, wherein said control means includes mechanical coupling means for synchronizing speeds of the two treadmill assemblies.

13. The dynamometer of claim 12, wherein said mechanical coupling means includes a variable length spline.

14. The dynamometer of claim 11, wherein said control means includes electrical synchronizing means for synchronizing the speeds of the treadmill assemblies.

15. The dynamometer of claim 11, wherein each of the simulation assemblies includes a flywheel.

16. The dynamometer of claim 11, wherein each of the simulation assemblies includes an eddy current brake.

17. The dynamometer of claim 11, wherein each of the simulation assemblies includes a motor.

18. The dynamometer of claim 17, wherein said motor is an electric motor.

19. The dynamometer of claim 11, wherein said guide mechanism includes one or more tracks extending axially of the vehicle tires, said tread mill assemblies being movable along said tracks.

20. The dynamometer of claim 11, wherein said simulation assembly includes an eddy current brake having a ferromagnetic rotor comprising a flywheel rotatably mounted on a shaft, said speed measuring means being coupled to the flywheel shaft, and said torque measuring means being coupled to the eddy current brake.

* * * * *